US012716511B2

(12) United States Patent
Luo et al.

(10) Patent No.: US 12,716,511 B2
(45) Date of Patent: Aug. 25, 2026

(54) VALVE CORE WITH MICROPOROUS STRUCTURE AND SOLENOID VALVE USING VALVE CORE

(71) Applicant: SUZHOU RAYONTECH TECHNOLOGY CO., LTD, Suzhou (CN)

(72) Inventors: Yong Luo, Suzhou (CN); Renqin Zhang, Suzhou (CN); Hongmei Chen, Suzhou (CN); Xiaoming Zhu, Suzhou (CN); Kai Yang, Suzhou (CN); Qiaoqiao Zhu, Suzhou (CN); Mengna Ru, Suzhou (CN)

(73) Assignee: SUZHOU RAYONTECH TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/957,025

(22) Filed: Nov. 22, 2024

(65) Prior Publication Data

US 2025/0084929 A1 Mar. 13, 2025

Related U.S. Application Data

(63) Continuation of application No. PCT/CN2022/110540, filed on Aug. 5, 2022.

(30) Foreign Application Priority Data

Jul. 22, 2022 (CN) ......................... 202210867201.6

(51) Int. Cl.

*F16K 25/00* (2006.01)
*F16K 13/00* (2006.01)

(Continued)

(52) U.S. Cl.

CPC ............ *F16K 25/005* (2013.01); *F16K 13/00* (2013.01); *F16K 31/06* (2013.01);

(Continued)

(58) Field of Classification Search

CPC .... F16K 25/005; F16K 31/0658; F16K 31/06; F16K 13/00; F16K 31/0644; F16K 31/082

See application file for complete search history.

(56) References Cited

U.S. PATENT DOCUMENTS 3,326,401 A * 6/1967 De Long ................ C12M 23/38 215/261
6,095,356 A * 8/2000 Rits .................... B65D 51/1616 215/261

(Continued)

FOREIGN PATENT DOCUMENTS

CN 112943943 A 6/2021
CN 215487658 U 1/2022

(Continued)

*Primary Examiner* — Craig M Schneider
*Assistant Examiner* — Christopher D Ballman
(74) *Attorney, Agent, or Firm* — Westbridge IP LLC

(57) ABSTRACT

Disclosed is a valve core with a microporous structure and a solenoid valve using the valve core. The solenoid valve comprises a valve body, an electromagnetic component, an elastic component and a valve core. The valve core comprises a sealing component and a microporous material. The valve core is arranged in the valve body, the elastic component is arranged between the valve core and the electromagnetic component, a flow channel is arranged on the valve body, the microporous material is matched with a flow channel on the valve body.

9 Claims, 2 Drawing Sheets

(51) Int. Cl.
*F16K 31/06* (2006.01)
*F16K 31/08* (2006.01)

(52) U.S. Cl.
CPC ...... *F16K 31/0644* (2013.01); *F16K 31/0658* (2013.01); *F16K 31/082* (2013.01)

(56) References Cited

U.S. PATENT DOCUMENTS

| | | | | |
|---|---|---|---|---|
| 7,461,754 | B2 * | 12/2008 | Walsh | B65D 53/04 215/261 |
| 7,851,204 | B2 * | 12/2010 | Klein | C12M 37/04 435/305.3 |
| 10,781,936 | B2 * | 9/2020 | Ramsperger | F02M 21/0266 |
| 11,009,142 | B2 * | 5/2021 | Emory | F16K 7/17 |
| 2017/0332566 | A1 * | 11/2017 | Emory | F16K 31/001 |

FOREIGN PATENT DOCUMENTS

| | | | |
|---|---|---|---|
| DE | 10226124 | A1 | 8/2003 |
| FR | 1470680 | A | 2/1967 |
| GB | 1046855 | A | 10/1966 |
| JP | 2001277777 | A | 10/2001 |
| WO | 2022079790 | A1 | 4/2022 |

* cited by examiner

VALVE CORE WITH MICROPOROUS STRUCTURE AND SOLENOID VALVE USING VALVE CORE

CROSS-REFERENCE TO RELATED APPLICATIONS

This application is a continuation of International Application No. PCT/CN2022/110540, filed on Aug. 5, 2022, which claims priority to Chinese Patent Application No. 202210867201.6, filed on Jul. 22, 2022. The disclosures of the above-mentioned applications are hereby incorporated by reference in their entireties.

TECHNICAL FIELD

The present disclosure relates to a valve core with a microporous structure and a solenoid valve using the valve core, belonging to the technical field of microfluidic control.

BACKGROUND

Microporous materials, due to their physical characteristics of being airtight under compression and ventilated in a relaxed state, have been widely used in many fields but have seen limited application in valve control. The applicant previously filed an application for "Valve Core Control Structure with Micro-Nano Porous Elastic Material". Although this patent involves micro-nano porous elastic material, the material is used as an auxiliary component added to the valve core. Its purpose is to add pilot opening characteristics to the sealing ring, replacing the existing pilot valve structure. However, the microporous material is not directly used for controlling the flow rate and pressure of the valve, and the flow control of the valve is still achieved through the opening degree of the valve core.

SUMMARY

In view of the above existing technical problems, the object of the present disclosure is to propose a valve core with a microporous structure and a solenoid valve using the valve core.

The technical solution of the present disclosure is achieved as follows: A valve core with a microporous structure, comprising a sealing component and a microporous material, wherein the sealing component is located at an upper end of the microporous material, and the sealing component seals a top of the microporous material; the microporous material is a flexible material with a microporous structure that allows fluid to pass through, and the microporous material is arranged to change the fluid flow rate by varying the degree of compressive deformation; and the flow control involves the adjustment and control of the flow rate, or the adjustment and control of the flow pressure.

Preferably, the sealing component is a magnetic material.

Preferably, the magnetic material is arranged in the microporous material.

Preferably, the magnetic material is magnetic powder.

Preferably, a multi-layer separation component is inserted into the microporous material, the separation component is the magnetic material, and the multi-layer separation component separates the microporous material into a multi-layer structure.

Preferably, a flow channel hole is arranged in a middle of the microporous material, and the flow channel hole passes through the multi-layer separation component inserted into the microporous material.

A solenoid valve using a valve core with a microporous structure, comprising a valve body, an electromagnetic component, an elastic component and a valve core; the valve core comprises a sealing component and a microporous material, wherein the sealing component is located at an upper end of the microporous material, and the sealing component seals a top of the microporous material; the microporous material is a flexible material with a microporous structure that allows fluid to pass through; the valve core is arranged in the valve body, the elastic component is arranged between the valve core and the electromagnetic component, a flow channel is arranged on the valve body, and the microporous material is matched with a flow channel on the valve body; when the electromagnetic component is not energized, the elastic component presses the valve core, such that the microporous material is in a compressed state, and the microporous material seals the flow channel on the valve body; when the electromagnetic component is energized, the valve core overcomes the elastic force of the elastic component to release the microporous material, allowing the flow channel on the valve body to be open; the electromagnetic component changes a compression amount of the microporous material by varying a magnitude of a magnetic attraction force, thereby controlling the flow rate of the flow channel on the valve body; and the flow control involves the adjustment and control of the flow rate, or the adjustment and control of the flow pressure.

Preferably, the elastic component is a spring or a spring plate.

Preferably, the valve body comprises a valve seat and a valve cover, the valve seat is tightly matched with the valve cover, a flow channel is arranged on the valve seat, and the electromagnetic component and the elastic component are arranged on the valve cover.

Preferably, a limiting structure that matches with a lower end of the microporous material is arranged on the valve seat.

After adopting the above technical solution, compared with the prior art, the present disclosure has the following advantages.

According to the valve core with the microporous structure, the sealing component and the microporous material are integrated into a unified structure, forming a monolithic valve core. The control of flow rate is entirely dependent on the compression amount of the microporous material, revolutionizing the traditional approach to controlling both flow rate and pressure in the solenoid valve. This approach enhances the precision of flow control within a certain range. Additionally, the adoption of this valve core structure simplifies the constitution of the solenoid valve, leading to cost savings and aligning with the trend of valve light weighting.

BRIEF DESCRIPTION OF THE DRAWINGS

In order to more clearly illustrate the technical solutions in the embodiments of the present disclosure, the drawings needed for the description of the embodiments of the present disclosure will be briefly introduced below. Obviously, the drawings in the following description are only some embodiments of the present disclosure, and for a person of ordinary skill in the art, other drawings can also be obtained based on the content of the embodiments of the present disclosure and the accompanying drawings without exerting creative efforts.

DETAILED DESCRIPTION OF THE EMBODIMENTS

To make the technical problems solved, the technical solutions adopted, and the technical effects achieved by the present disclosure clearer, the technical solutions of embodiments of the present disclosure will be further described in detail below with reference to the accompanying drawings. Obviously, the described embodiments are only a part of the embodiments of the present disclosure, not all of them. All other embodiments obtained by those skilled in the art based on the embodiments in the present disclosure without creative work belong to the scope of protection of the present disclosure.

In the description of the present disclosure, it should be noted that the terms "center", "upper", "lower", "left", "right", "vertical", "straight", "horizontal", "inner", "outer", and other indicated directions or positional relationships are based on the directions or positional relationships shown in the accompanying drawings. They are only used to describe the present disclosure and simplify the description, rather than indicating or suggesting that the device or element referred to must have a specific orientation, be constructed and operated in a specific orientation. Therefore, they cannot be understood as limitations of the present disclosure. In addition, the terms "first" and "second" are only used for descriptive purposes and cannot be understood as indicating or suggesting relative importance. Among them, the terms "first position" and "second position" refer to two different positions.

In the description of the present disclosure, it should be noted that unless otherwise clearly specified and limited, the terms "installed", "connected with", and "connected to" should be understood in a broad sense. For example, it can be a fixed connection or a detachable connection; it can be a mechanical connection or an electrical connection; it can be a direct connection or an indirect connection through an intermediate medium, which can be the communication within two components. For those skilled in the art, the specific meanings of the above terms in the present disclosure can be understood according to specific situations.

Figure 1:
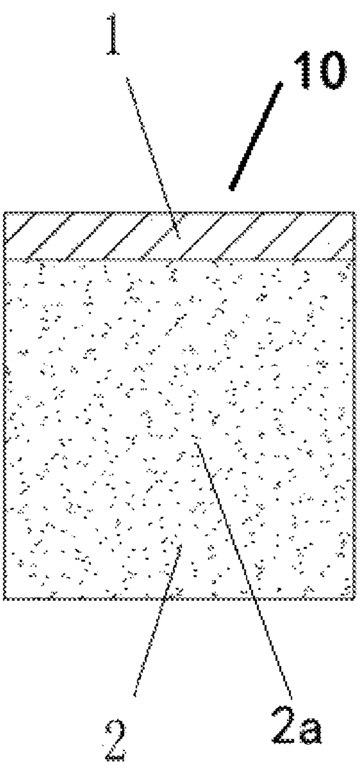
FIG. 1 is a schematic structural diagram of an embodiment of a valve core with a microporous structure according to the present disclosure.

As shown in FIG. 1, according to an embodiment of the present disclosure, a valve core 10 with a microporous structure, comprising a sealing component 1 and a microporous material 2, wherein the sealing component 1 is located at an upper end of the microporous material 2, and the sealing component 1 seals a top of the microporous material 2 to prevent air leakage from the top of the microporous material 2.

The sealing component 1 can be a circular disc, block, or other structures, and the specific structure is designed according to the internal structure of the valve. The microporous material 2 is a flexible material containing a microporous structure 2*a*, and the micropores can be nanometer-sized pores or larger or smaller pore structures selected according to the flow control requirements.

The sealing component 1 and the microporous material 2 can be integrated into a one-piece structure through bonding or other methods to form a valve core used in a solenoid valve.

To enable the valve core to cooperate with the electromagnetic component of the solenoid valve, the following methods can be adopted:

(1) The sealing component 1 is made of a magnetic material, which refers to a material that can respond to a magnetic field, such as common ferromagnetic substances or magnets.

(2) The sealing component 1 is made of a magnetic or non-magnetic material, and magnetic material powder is doped into the microporous material 2.

Figure 2:
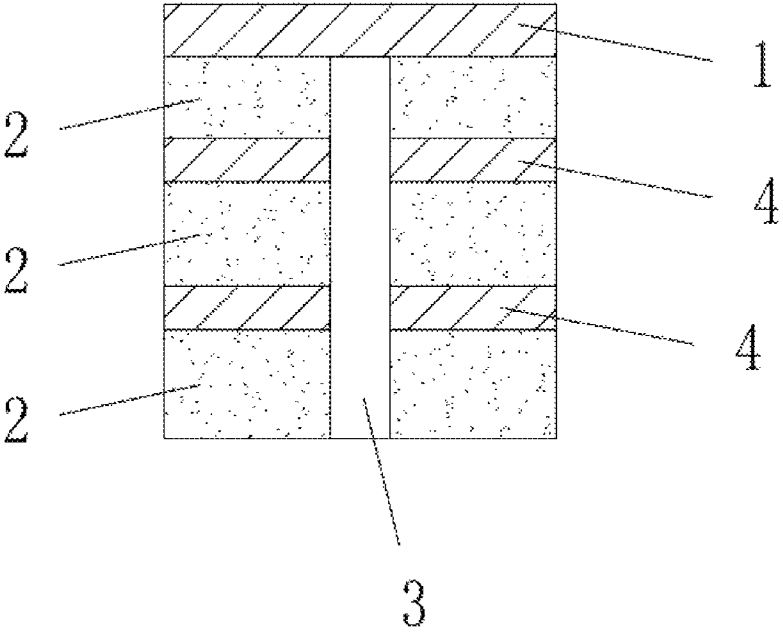
FIG. 2 is a schematic structural diagram of another embodiment of a valve core with a microporous structure according to the present disclosure.

(3) As shown in FIG. 2, the sealing component 1 is made of a magnetic or non-magnetic material, and a multi-layer separation component 4 is inserted into the microporous material 2, where the separation component 4 is made of a magnetic material.

(4) Based on (3), magnetic material powder is also doped into the microporous material 2.

The multi-layer separation component 4 shown in FIG. 2 separates the microporous material 2 into a multi-layer structure, enabling graded compression of the microporous material 2 and providing more diverse control methods. The separation component 4 can be in the form of a mesh plate or a partition plate. If a partition plate is used, a flow channel hole 3 need to be provided in the microporous material 2, and the flow channel hole 3 passes through the multi-layer separation component 4 to prevent multi-layer sealing component 1 from obstructing fluid flow.

The magnetic material powder can be doped during the production process of the microporous material 2. For example, the magnetic material powder can be doped into 3D printing materials, and then the microporous material 2 can be printed through 3D printing; alternatively, the magnetic material powder can be doped into the raw materials of the microporous material before expanding to form a microporous structure. These methods allow for good integration of the powder with the microporous material.

The microporous material controls the fluid flow rate by varying the degree of compression deformation. The fluid can be a gas or a liquid. The flow control involves the adjustment and control of the flow rate, or the adjustment and control of the flow pressure.

Figure 3:
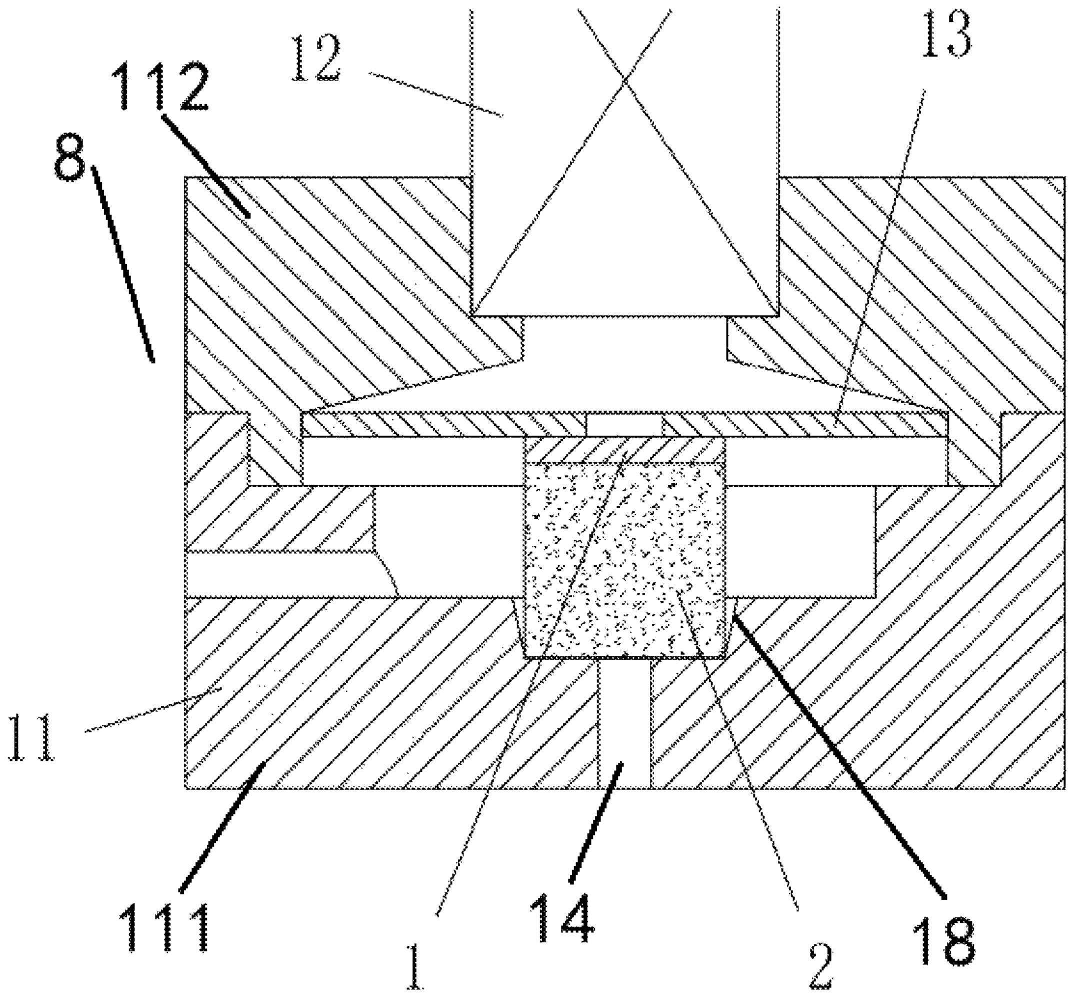
FIG. 3 is a schematic structural diagram of a solenoid valve using a valve core with a microporous structure according to the present disclosure.

FIG. 3 is an application of the valve core 10 in a solenoid valve 8. The solenoid valve 8 comprises a valve body 11, an electromagnetic component 12, an elastic component 13 and athe valve core 10. The valve core 10 may adopt the structure shown in FIGS. 1 and 2, the valve core 10 is arranged in the valve body 11, the elastic component 13 is arranged between the valve core 10 and the electromagnetic component 12, a flow channel 14 is arranged on the valve body 11, and the microporous material 2 is matched with a the flow channel 14 on the valve body 11.

When the electromagnetic component 12 is not energized, the elastic component 13 presses the valve core 10, such that the microporous material 2 is in a compressed state, and the microporous material 2 seals the flow channel on the valve body 11.

When the electromagnetic component 12 is energized, the electromagnetic component 12 generates a magnetic attraction force on the magnetic material or magnetic material powder. This force causes the valve core 10 to overcome the elastic force of the elastic component 13, relaxing the microporous material 2. As a result, the microporous structure 2*a* within the microporous material 2 becomes permeable, allowing the flow channel on the valve body 11 to be open.

The electromagnetic component 12 changes a compression amount of the microporous material 2 by varying a magnitude of a magnetic attraction force, thereby controlling the flow rate of the flow channel 14 on the valve body 11.

The elastic component 13 may be a component such as a spring or a spring plate. The valve body 11 comprises a valve seat 111 and a valve cover 112, the valve seat 111 is tightly matched with the valve cover 112, the flow channel 14 is arranged on the valve seat 111, and the electromagnetic component 12 and the elastic component 13 are arranged on the valve cover 112.

To ensure the stability of valve control, a limiting structure 18 that matches with a lower end of the microporous material 2 can be arranged on the valve seat 111 to limit the position of the valve core 10; alternatively, the upper or lower end of the valve core 10 can be directly fixed in the internal structure of the valve body through adhesion or other means; and for the micro-valve, due to its small inner space, the microporous material can fully occupy the entire inner space of the valve without requiring additional fixation.

The above embodiments serve only to illustrate the technical concepts and characteristics of the present disclosure, with the aim of enabling those skilled in the art to understand and implement the content of the present disclosure. They do not limit the scope of protection of the present disclosure. Any equivalent variations or modifications made based on the spirit and substance of the present disclosure should be covered within its scope of protection.

What is claimed is:

1. A valve core with a microporous structure, comprising a sealing component and a microporous material, wherein the sealing component is located at an upper end of the microporous material, and the sealing component seals a top of the microporous material; and the microporous material is a flexible material with a microporous structure that allows fluid to pass through, and the microporous material is arranged to change the fluid flow rate by varying the degree of compressive deformation; wherein the sealing component is a magnetic material.

2. The valve core with the microporous structure according to claim 1, wherein the magnetic material is arranged in the microporous material.

3. The valve core with the microporous structure according to claim 2, wherein the magnetic material is magnetic powder.

4. The valve core with the microporous structure according to claim 2, wherein a multi-layer separation component is inserted into the microporous material, the separation component is the magnetic material, and the multi-layer separation component separates the microporous material into a multi-layer structure.

5. The valve core with the microporous structure according to claim 4, wherein a flow channel hole is arranged in a middle of the microporous material, and the flow channel hole passes through the multi-layer separation component inserted into the microporous material.

6. A solenoid valve using a valve core with a microporous structure, comprising a valve body, an electromagnetic component, an elastic component and a valve core;

the valve core comprises a sealing component and a microporous material, wherein the sealing component is located at an upper end of the microporous material, and the sealing component seals a top of the microporous material; the microporous material is a flexible material with a microporous structure that allows fluid to pass through;

the valve core is arranged in the valve body, the elastic component is arranged between the valve core and the electromagnetic component, a flow channel is arranged on the valve body, and the microporous material is matched with a flow channel on the valve body;

when the electromagnetic component is not energized, the elastic component presses the valve core, such that the microporous material is in a compressed state, and the microporous material seals the flow channel on the valve body;

when the electromagnetic component is energized, the valve core overcomes the elastic force of the elastic component to release the microporous material, allowing the flow channel on the valve body to be open; and the electromagnetic component changes a compression amount of the microporous material by varying a magnitude of a magnetic attraction force, thereby controlling the flow rate of the flow channel on the valve body.

7. The solenoid valve according to claim 6, wherein the elastic component is a spring or a spring plate.

8. The solenoid valve according to claim 6, wherein the valve body comprises a valve seat and a valve cover, the valve seat is tightly matched with the valve cover, a flow channel is arranged on the valve seat, and the electromagnetic component and the elastic component are arranged on the valve cover.

9. The solenoid valve according to claim 8, wherein a limiting structure that matches with a lower end of the microporous material is arranged on the valve seat.

* * * * *